United States Patent
Wang et al.

(10) Patent No.: US 8,821,189 B2
(45) Date of Patent: Sep. 2, 2014

(54) ELECTRICAL CONNECTOR AND HANDHELD ELECTRONIC DEVICE

(75) Inventors: Chen-Yu Wang, Taoyuan County (TW); Tsung-Yuan Ou, Taoyuan County (TW); Hsu-Hsiang Tseng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 189 days.

(21) Appl. No.: 13/437,949

(22) Filed: Apr. 3, 2012

(65) Prior Publication Data

US 2013/0260617 A1    Oct. 3, 2013

(51) Int. Cl.
*H01R 13/66* (2006.01)
*H04M 1/02* (2006.01)

(52) U.S. Cl.
CPC ............ *H01R 13/6608* (2013.01); *H04M 1/02* (2013.01)
USPC .................................. 439/620.21; 455/575.1

(58) Field of Classification Search
CPC ..... H01R 13/66; H01R 13/6608; H04M 1/02; H04M 1/0202
USPC ......... 439/620.01, 620.15, 620.21; 455/575.1
See application file for complete search history.

(56) References Cited

U.S. PATENT DOCUMENTS

| | | | |
|---|---|---|---|
| 5,836,790 A | * | 11/1998 | Barnett .................... 439/620.22 |
| 2003/0153213 A1 | * | 8/2003 | Siddiqui et al. ............... 439/668 |
| 2010/0216526 A1 | | 8/2010 | Chen et al. |

FOREIGN PATENT DOCUMENTS

| TW | M295859 | 8/2006 |
|---|---|---|
| TW | 200849847 | 12/2008 |

OTHER PUBLICATIONS

"Office Action of Taiwan Counterpart Application", issued on May 1, 2014, p.1-p.7, in which the listed references were cited.

* cited by examiner

*Primary Examiner* — Khiem Nguyen
(74) *Attorney, Agent, or Firm* — Jianq Chyun IP Office

(57) ABSTRACT

An electrical connector including a body, an electrical contact and a microphone is provided. The body has a front part and a plug aperture on the front part. The electrical contact is disposed in the plug aperture. The microphone is disposed inside the body and connected to the outside of the body through an acoustic path provided by the body. The electrical connector is adapted to a handheld electronic device, such as a mobile phone, wherein a housing of the handheld electronic device can be provided without an independent sound input aperture for the microphone, to simplify the structural design of the housing. Furthermore, at least a through hole may be formed outside the plug aperture to form multiple acoustic paths.

12 Claims, 5 Drawing Sheets

ELECTRICAL CONNECTOR AND HANDHELD ELECTRONIC DEVICE

BACKGROUND

1. Field of the Application

The present application generally relates to an electrical connector. More particularly, the present application relates to a structure integrating a data transmission interface and an acoustic interface into an electrical connector.

2. Description of Related Art

Recently, as the development of electronic technology advances, the handheld electronic devices such as mobile phones, tablet computers, and notebook computers are widely used and developed to be more convenient, multi-functional and beautiful in aspect, to provide different products for users to choose from. In general, the aforementioned handheld electronic device (or multimedia mobile device) is provided with an electrical connector, such as a Universal Serial Bus (USB) connector, to transmit data with a computer, or be charged through an AC adapter, and provided with a microphone for communicating or recording.

Because of the handheld electronic device includes a microphone, a sound input aperture is conventionally required on the housing of the handheld electronic device. However, as the product design of the handheld electronic device becomes lighter, slimmer and compact, it is hard and complicate to form an independent sound input aperture for the microphone.

SUMMARY

Accordingly, the present application is directed to an electrical connector integrated with a microphone, so as to simply aspect design and spatial arrangement of a handheld electronic device applying the electrical connector and save the manufacturing cost of the same.

According to an embodiment of the present application, the electrical connector includes a body, an electrical contact and a microphone. The body has a front part and a plug aperture on the front part. The electrical contact is disposed in the plug aperture. The microphone is disposed inside the body and connected to the outside of the body through an acoustic path provided by the body.

The present application is also directed to a handheld electronic device applying the aforementioned electrical connector integrated with the microphone, by which the aspect design and the spatial arrangement of the handheld electronic device are simplified, to provide beautiful appearance, achieve flexible arrangement for internal components, reduce number of components, and save the manufacturing cost.

According to an embodiment of the present application, the handheld electronic device includes a housing, an electronic processor disposed in the housing, and the aforementioned electrical connector coupled to the electronic processor.

Based on the above, the microphone is integrated with the electrical connector, wherein an acoustic path can be formed with an original plug aperture of the electrical connector and/or an additional through hole. Therefore, the total spatial arrangement of the microphone and the electrical connector can be simplified and the manufacturing cost can be reduced. In addition, the space reserved for the microphone and the acoustic path in the handheld electronic device can be released by applying the electrical connector, so as to simplify the structural design and the spatial arrangement of the handheld electronic device, and make the arrangement of other components more flexible. Moreover, the microphone and the electrical connector are integrated into a union part to reduce the number of components. Furthermore, the housing of the handheld electronic device can be provided without independent sound input aperture, such that the structural design of the housing is simplified to form a compact and beautiful appearance.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF THE EMBODIMENTS

Figure 1A:
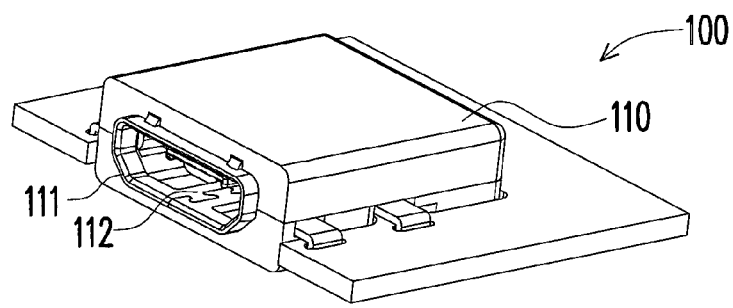
FIG. 1A shows an electronic connector in a perspective view according to an embodiment of the present application.

Reference will now be made in detail to the present preferred embodiments of the application, examples of which are illustrated in the accompanying drawings. Wherever possible, the same reference numbers are used in the drawings and the description to refer to the same or like parts.

Figure 1B:
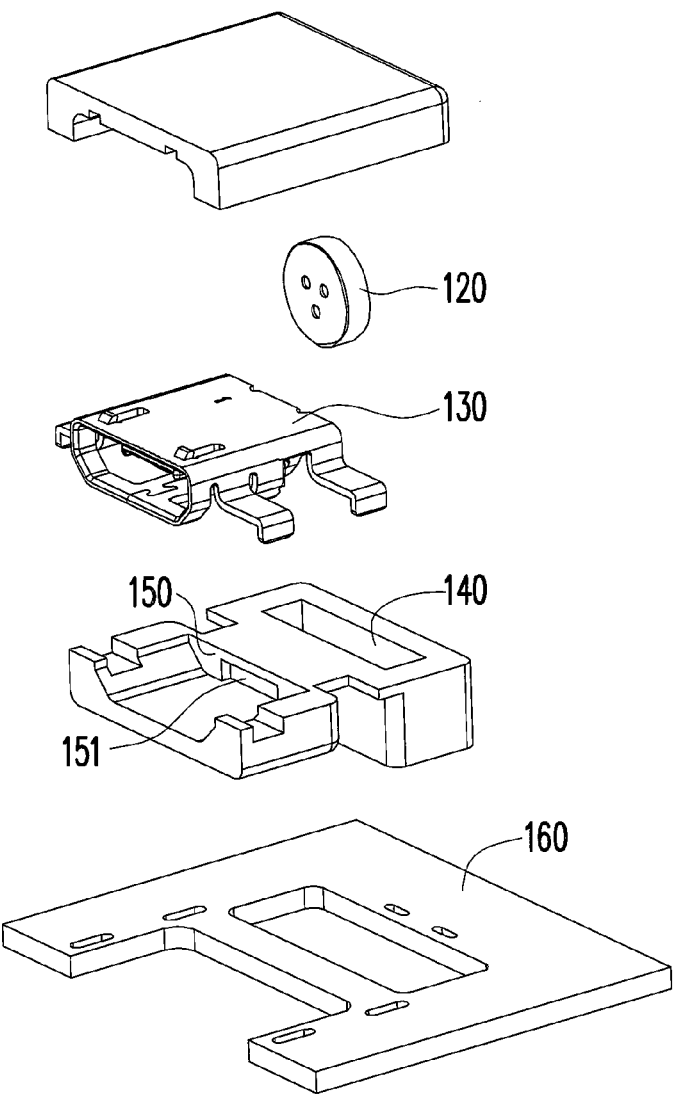
FIG. 1B is an explosion diagram of an electronic connector according to an embodiment of the present application.
Figure 1C:
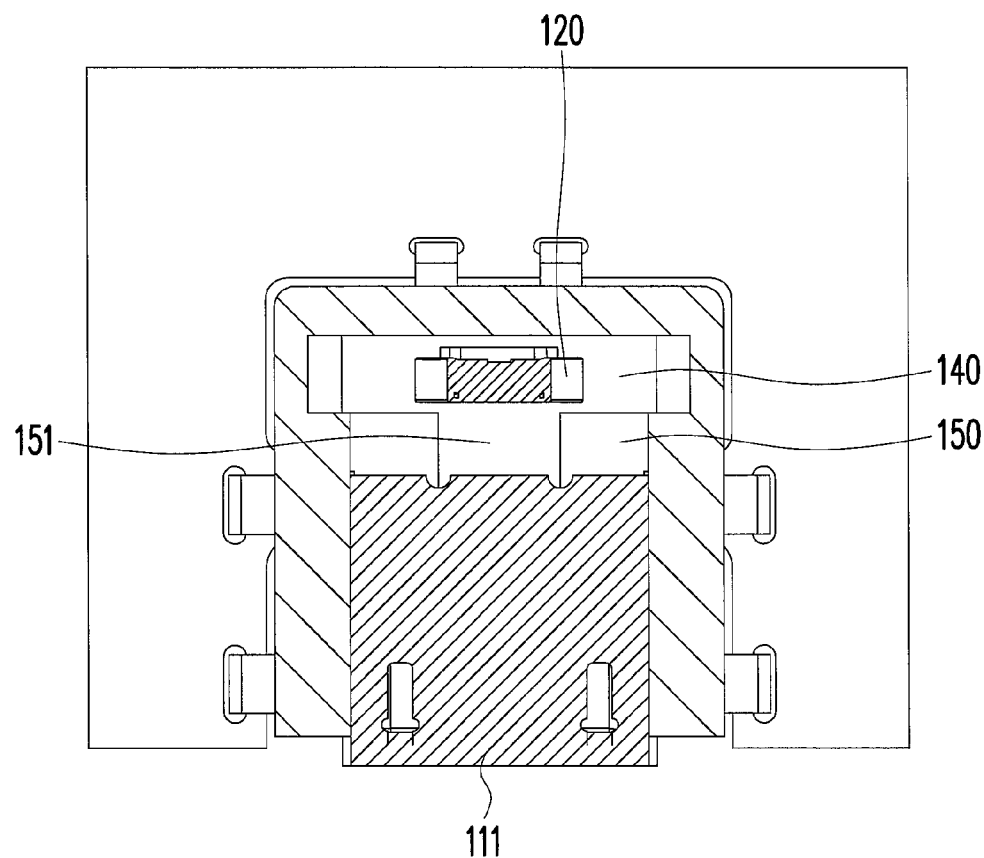
FIG. 1C is a cross-sectional view of an electronic connector according to an embodiment of the present application.

FIG. 1A shows an electronic connector 100 in a perspective view according to an embodiment of the present application. FIG. 1B is an explosion diagram of the electronic device 100. FIG. 1C is a cross-sectional view of the electronic device 100. Referring to FIGS. 1A, 1B and 1C, the electrical connector 100 is mounted on a printed circuit board 160 and includes a body 110, a microphone 120, an electrical contact 130, a microphone containing portion 140 and a partition 150. The body 110 has a plug aperture 111 in its front part and an acoustic path 112. The microphone 120 is disposed in the microphone containing portion 140 in the rear part of the body 110. The electrical contact 130 is adapted to connect an external connector and an internal mother board for transmitting electric signals. More specifically, the electrical connector 100 of the present embodiment may be a Universal Serial Bus (USB) connector, a Micro Universal Serial Bus (Micro USB) connector, a High Definition Multimedia Interface (HDMI) connector or other applicable electrical connectors.

In this embodiment, the plug aperture 111 in the front part of the body 110 and the microphone containing portion 140 in the rear part of the body 110 are divided from each other by the partition 150. The partition 150 is provided with at least an opening 151 between the microphone 120 and the plug aperture 111, such that the microphone 120 can be connected to the outside through the opening 151 on the partition 150 and the plug aperture 111, to receive sound signals. However, the partition 150 can further be omitted in other embodiments, such that the plug aperture 111 can connect to the microphone 120 directly for receiving external sound signals.

To the present embodiment, the electrical connector 100 may further be provided with an encapsulant (not shown) made of rubber and encapsulating the microphone 120, the periphery of the microphone containing portion 140 or other places where clearances are probably formed, to reduce noise received by the microphone 120. However, the encapsulant may not be required while the original structure is already in good coverage.

Figure 2A:
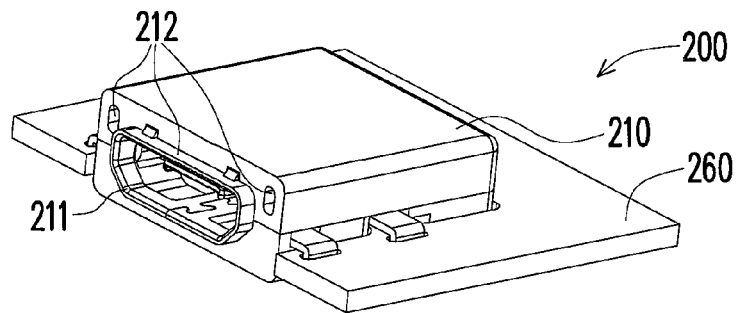
FIG. 2A shows an electronic connector in a perspective view according to an embodiment of the present application.
Figure 2B:
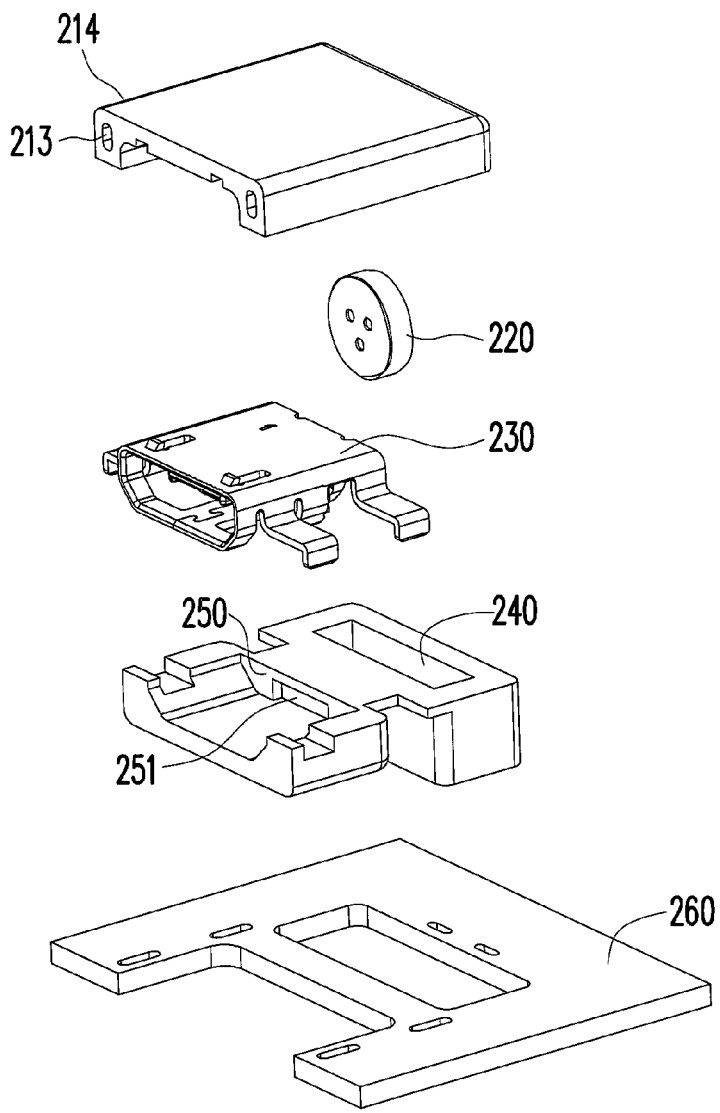
FIG. 2B is an explosion diagram of an electronic connector according to an embodiment of the present application.
Figure 2C:
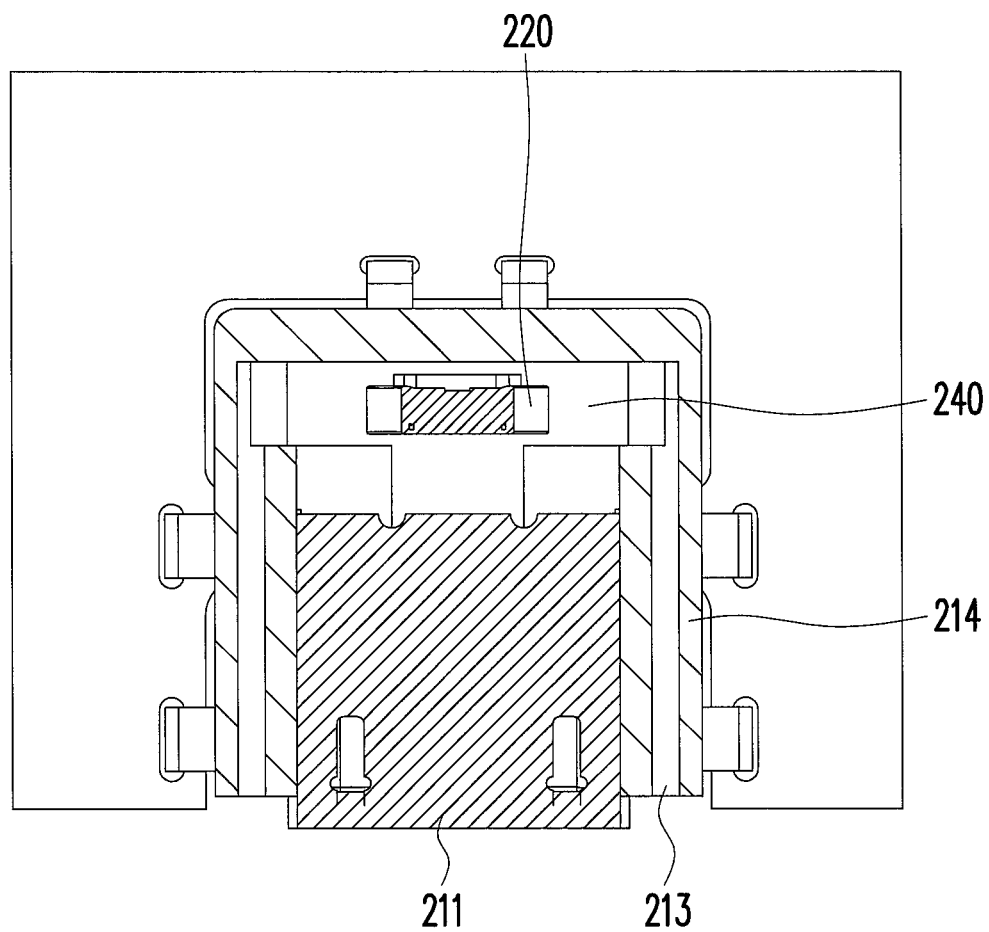
FIG. 2C is a cross-sectional view of an electronic connector according to an embodiment of the present application.

FIG. 2A shows an electronic connector 200 in a perspective view according to an embodiment of the present application. FIG. 2B is an explosion diagram of the electronic device 200. FIG. 2C is a cross-sectional view of the electronic device 200. Referring to FIGS. 2A, 2B and 2C, the electrical connector 200 is similar to the aforementioned electrical connector 100, except that the body 210 is provided with at least a through hole 213 (here shows plural through holes 213) located in a periphery 214 of the body 210 outside the plug aperture 211 and serving as another acoustic path 212 for the microphone 220. More specifically, the sound signals may be incapable of being transmitted to the microphone 220 through the plug aperture 211 when the plug aperture 211 receives an external connector, and instead, the acoustic path 212 formed by the through holes 213 in the periphery 214 of the body 210 can be taken as the primary acoustic path, to transmit the sound signals to the microphone 220. In other words, the microphone 220 can be normally operated when the electrical connector 200 is plugged or unplugged with the external connector. Furthermore, in other embodiments, the through holes 213 in the periphery 214 of the body 210 can be solely formed without forming openings 251 on the partition 250, such that source of the sound signals is simplex, and similarly the microphone 220 can also be normally operated when the electrical connector 200 is plugged or unplugged with the external connector.

Figure 3:
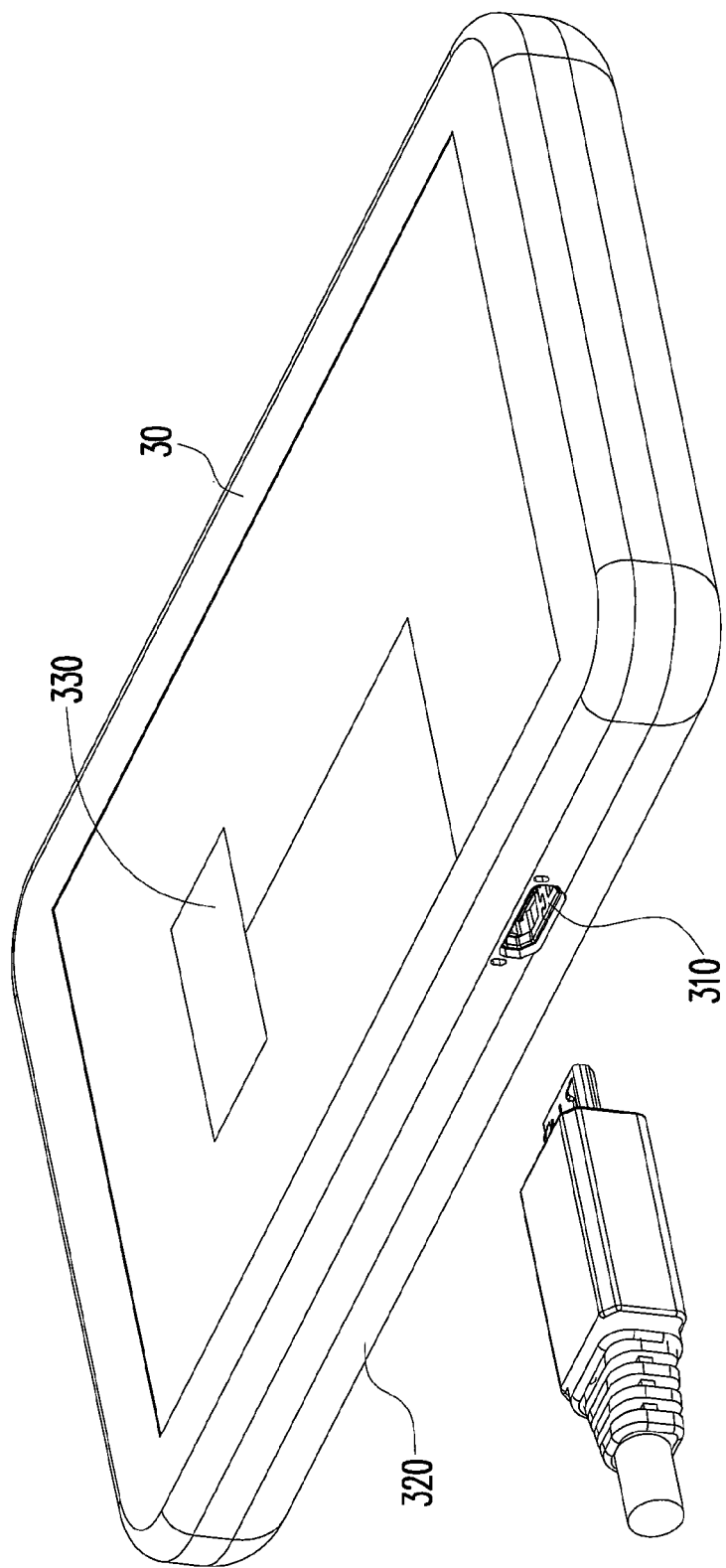
FIG. 3 shows a handheld electronic device in a perspective view according to an embodiment of the present application.

FIG. 3 shows a handheld electronic device in a perspective view according to an embodiment of the present application. Referring to FIG. 3, the handheld electronic device 30 includes a housing 320, an electronic processor 330 disposed in the housing, and an electrical connector 310 coupled to the electronic processor 330. The electrical connector 310 may be the electrical connector 100 or the electrical connector 200 as mentioned in the above embodiments, to receive sound signals and electric signals, and transmit the signals to the electronic processor 330 in the housing 320. More specifically, the housing 320 can be provided with merely a single aperture for the electrical connector 310, such as a plug aperture of a Micro Universal Serial Bus (Micro USB) connector, to form a compact and beautiful appearance.

In summary, the microphone is integrated with the electrical connector, wherein an acoustic path can be formed from an original plug aperture of the electrical connector and/or an additional through hole. Therefore, the total spatial arrangement of the microphone and the electrical connector can be simplified. In addition, the space reserved for the microphone in the handheld electronic device can be released by applying the electrical connector, so as to simplify the structural design and the spatial arrangement of the handheld electronic device, and make the arrangement of other components more flexible. Furthermore, the housing of the handheld electronic device can be provided without independent sound input aperture, such that the structural design of the housing is simplified to form a compact and beautiful appearance.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. An electrical connector, comprising:
   a body having a front part provided with a plug aperture and at least one through hole outside the plug aperture;
   an electrical contact disposed in the plug aperture; and
   a microphone disposed inside the body and connected to an outside of the body through an acoustic path provided by the body, wherein the plug aperture and the at least one through hole are configured to serve as the acoustic path.

2. The electrical connector of claim 1, wherein the microphone is disposed at a rear part of the body opposite to the front part.

3. The electrical connector of claim 1, wherein the body comprises a partition, and the microphone and the plug aperture are respectively located on two opposite sides of the partition and connected with each other through at least an opening on the partition.

4. The electrical connector of claim 1, further comprising an encapsulant encapsulating the microphone.

5. The electrical connector of claim 4, wherein the encapsulant comprises a rubber.

6. The electrical connector of claim 1, wherein the electrical connector comprises a Micro Universal Serial Bus (Micro USB).

7. A handheld electronic device, comprising:
   a housing;
   an electronic processor disposed in the housing;
   an electrical connector coupled to the electronic processor, the electrical connector comprising:
      a body having a front part provided with a plug aperture and at least one through hole outside the plug aperture;
      an electrical contact disposed in the plug aperture; and
      a microphone disposed inside the body and connected to an outside of the body through an acoustic path provided by the body, wherein the plug aperture and the at least one through hole are configured to serve as the acoustic path.

8. The handheld electronic device of claim 7, wherein the microphone is disposed at a rear part of the body opposite to the front part.

9. The handheld electronic device of claim 7, wherein the body comprises a partition, and the microphone and the plug aperture are respectively located on two opposite sides of the partition and connected with each other through at least an opening on the partition.

10. The handheld electronic device of claim 7, wherein the electrical connector further comprises an encapsulant encapsulating the microphone.

11. The handheld electronic device of claim 10, wherein the encapsulant comprises a rubber.

12. The handheld electronic device of claim 7, wherein the electrical connector comprises a Micro Universal Serial Bus (Micro USB).

* * * * *